(12) United States Patent
Ishikawa et al.

(10) Patent No.: US 11,987,478 B2
(45) Date of Patent: May 21, 2024

(54) GUIDE DISPLAY DEVICE AND CRANE PROVIDED WITH SAME

(71) Applicants: TADANO LTD., Kagawa (JP); THE SCHOOL CORPORATION KANSAI UNIVERSITY, Osaka (JP)

(72) Inventors: Iwao Ishikawa, Kagawa (JP); Takayuki Kosaka, Kagawa (JP); Keita Mashima, Kagawa (JP); Satoshi Kubota, Osaka (JP); Shigenori Tanaka, Osaka (JP); Masaya Nakahara, Osaka (JP); Koki Nakahata, Osaka (JP)

(73) Assignees: TADANO LTD., Kagawa (JP); THE SCHOOL CORPORATION KANSAI UNIVERSITY, Osaka (JP)

( * ) Notice: Subject to any disclaimer, the term of this patent is extended or adjusted under 35 U.S.C. 154(b) by 122 days.

(21) Appl. No.: 17/911,029

(22) PCT Filed: Mar. 23, 2021

(86) PCT No.: PCT/JP2021/012003
§ 371 (c)(1),
(2) Date: Sep. 12, 2022

(87) PCT Pub. No.: WO2021/193638
PCT Pub. Date: Sep. 30, 2021

(65) Prior Publication Data
US 2023/0094743 A1 Mar. 30, 2023

(30) Foreign Application Priority Data
Mar. 26, 2020 (JP) .................. 2020-056810

(51) Int. Cl.
*B66C 13/46* (2006.01)
*G01S 17/89* (2020.01)
(Continued)

(52) U.S. Cl.
CPC .............. *B66C 13/46* (2013.01); *G01S 17/89* (2013.01); *G06T 7/13* (2017.01); *G06V 10/443* (2022.01); *G06T 2207/10028* (2013.01)

(58) Field of Classification Search
CPC ......... B66C 13/46; G06T 7/13; G06V 10/443; G01S 17/89
(Continued)

(56) References Cited

U.S. PATENT DOCUMENTS 4,752,012 A * 6/1988 Juergens ............... B66C 23/905
212/277
5,067,013 A * 11/1991 Lindholm ............... B66C 13/46
294/81.4
(Continued)

FOREIGN PATENT DOCUMENTS

DE  10 2017 112 661 A1  12/2018
JP  2019-024151 A  2/2019

OTHER PUBLICATIONS

Jun. 8, 2021, International Search Report issued for related PCT Application No. PCT/JP2021/012003.
(Continued)

*Primary Examiner* — Kerri L McNally
(74) *Attorney, Agent, or Firm* — Paratus Law Group, PLLC

(57) ABSTRACT

Provided is a guide display device with which incorrect recognition of a place having small features as a ground surface having no features can be suppressed in generating and updating a three-dimensional map. A data processing unit (70): detects an edge (Eg) of a feature (E) on the basis of a result of subjecting image data captured by a camera (61) to image processing, and recognizes the feature (E) on the basis of the edge (Eg); and accumulates, from a predetermined number of frames from before the time at which the image data was captured, point group data (P) of a nearby range (Ma) of the edge (Eg) of the feature (E) that was recognized as a ground surface (F), and generates, on the basis of the accumulated point group data (P), a three-dimensional map (M) of the feature (E) the edge (Eg) of which has been recognized.

7 Claims, 17 Drawing Sheets

(51) Int. Cl.
*G06T 7/13* (2017.01)
*G06V 10/44* (2022.01)

(58) Field of Classification Search
USPC .......................................................... 340/685
See application file for complete search history.

(56) References Cited

U.S. PATENT DOCUMENTS

| | | |
|---|---|---|
| 11,084,692 B2 | 8/2021 | Kosaka et al. |
| 2005/0281644 A1* | 12/2005 | Lussen .................. B66C 13/085 |
| | | 414/403 |
| 2013/0013251 A1* | 1/2013 | Schoonmaker ......... B66C 15/04 |
| | | 702/152 |
| 2013/0147640 A1* | 6/2013 | Stocker ................... B66C 13/16 |
| | | 340/928 |
| 2016/0167932 A1* | 6/2016 | Holmberg ............. B66C 19/002 |
| | | 382/104 |
| 2018/0143011 A1* | 5/2018 | Rudy ...................... B66C 23/76 |
| 2018/0170720 A1* | 6/2018 | Mannari .................. G01S 7/481 |
| 2021/0147192 A1 | 5/2021 | Klement et al. |

OTHER PUBLICATIONS

Jun. 8, 2021, International Search Opinion issued for related PCT Application No. PCT/JP2021/012003.

Mar. 25, 2024, European Search Report issued for related EP Application No. 21776972.8.

* cited by examiner

GUIDE DISPLAY DEVICE AND CRANE PROVIDED WITH SAME

CROSS REFERENCE TO PRIOR APPLICATION

This application is a National Stage Patent Application of PCT International Patent Application No. PCT/JP2021/012003 (filed on Mar. 23, 2021) under 35 U.S.C. § 371, which claims priority to Japanese Patent Application No. 2020-056810 (filed on Mar. 26, 2020), which are all hereby incorporated by reference in their entirety.

TECHNICAL FIELD

The present invention relates to a guide display device and a crane including the same.

BACKGROUND ART

In the related art, a guide display device that can present information related to positions and altitudes of a lifting cargo and a ground object around the lifting cargo to the operator is publicly known. Such a guide display device is disclosed in PTL 1.

The guide display device disclosed in PTL 1 includes a data processing section that calculates a representative point for each grid cell by using point group data acquired by a laser scanner and creates a three-dimensional map based on the representative point. The data processing section generates a guide information such as a guide frame diagram surrounding the lifting cargo and the ground object, and displays the guide information in a superimposed manner on the image captured by the camera on a data display section. With such a guide display device, the information related to positions and altitudes of the lifting cargo and the ground object around the lifting cargo can be presented to the operator.

CITATION LIST

Patent Literature

PTL 1
Japanese Patent Application Laid-Open No. 2019-24151

SUMMARY OF INVENTION

Technical Problem

However, in the guide display device disclosed in PTL 1, at the time of generating and updating the three-dimensional map for small ground objects with a size that falls within the measuring line interval of the laser emitted from the laser scanner, the height of the position of the ground object in the three-dimensional map may be recognized to be the same as the height of the region around the ground object, that is, the ground object may be erroneously recognized to be the ground surface. Note that in the following description, ground objects with a size that falls within the measuring line interval of the laser emitted from the laser scanner are simply referred to as "small ground object".

To solve the above-described problems, an object of the present invention is to provide a guide display device that can reduce a situation where the location where a small ground object is located is erroneously recognized to be the ground surface where there is no ground object at the time when generating and updating the three-dimensional map, and can recognize the ground object regardless of the size of the ground object.

Solution to Problem

The problems to be solved by the present invention are as described above, and a solution to the problems is described below.

A guide display device of a crane according to the present invention includes: a data processing section configured to calculate a representative point for each grid cell by using point group data acquired with a laser scanner by scanning a lifting cargo, a ground surface and a ground object from above the lifting cargo, create a three-dimensional map based on the representative point, and update the three-dimensional map when a representative point calculated anew and an existing representative point are different from each other, wherein the data processing section detects an edge of the ground object based on a result of image processing of image data of the lifting cargo, the ground surface and the ground object captured with a camera from above the lifting cargo, recognizes the ground object based on the edge, accumulates, for predetermined frames prior to a time point of capturing the image data, the point group data that is in a nearby range of the edge of the ground object and is recognized to be the ground surface, and generates the three-dimensional map of the ground object whose edge is recognized based on the point group data that is accumulated.

In addition, in the guide display device according to the present invention, the data processing section cuts the three-dimensional map that is generated, into a plurality of layers in a height direction for each grid cell, and updates the three-dimensional map to set, as a height of the ground object, an average altitude value of the point group data included in a highest layer of the plurality of layers.

In addition, in the guide display device according to the present invention, the nearby range of the edge includes a total of nine grid cells composed of the grid cell where the edge passes through, and eight grid cells located around the grid cell where the edge passes through.

In addition, in the guide display device according to the present invention, the data processing section accumulates the three-dimensional map of the ground object whose edge is recognized.

In addition, in the guide display device according to the present invention, the data processing section calculates the edge through an image process based on a Canny method.

In addition, the guide display device according to the present invention further comprising a data display section configured to display the image captured with the camera, guide information generated based on the three-dimensional map is displayed on the data display section in a superimposed manner on the image captured with the camera.

A crane according to the present invention includes the above-described guide display device.

Advantageous Effects of Invention

Effects of the present invention are as described below.

With the guide display device according to the present invention, a situation where the location where a small ground object is located is erroneously recognized as the ground surface where there is no ground object when generating and updating the three-dimensional map can be reduced. In this manner, the ground object can be recognized regardless of the size of the ground object.

In addition, with the guide display device according to the present invention, the height of the small ground object can be recognized.

In addition, with the guide display device according to the present invention, the position of the small ground object can be recognized.

In addition, with the guide display device according to the present invention, the small ground object can be reliably recognized.

In addition, with the guide display device according to the present invention, the approximate position of the edge of the small ground object can be recognized in real time.

In addition, with the guide display device according to the present invention, the guide display of the small ground object can be performed.

In addition, with the crane according to the present invention, the small ground object can be reliably recognized with the guide display device.

DESCRIPTION OF EMBODIMENTS

First, a crane according to an embodiment of the present invention 1 is described.

Figure 1:
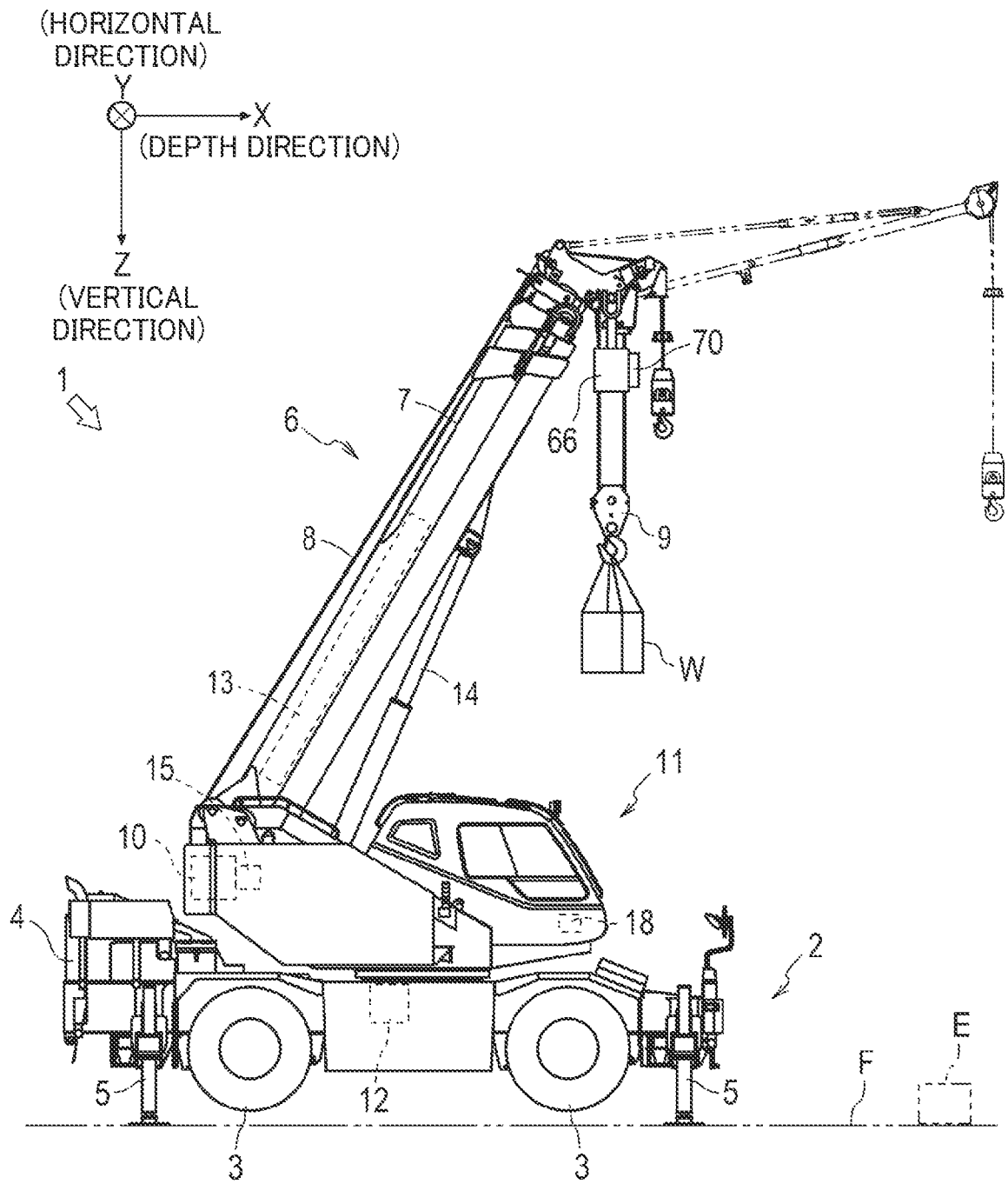
FIG. 1 is a diagram illustrating a crane according to an embodiment of the present invention.

As illustrated in FIG. 1, crane 1 is a mobile crane that can move to an unspecified location.

Crane 1 Includes Travelling Vehicle 2 and Crane Apparatus 6.

Travelling vehicle 2 transports crane apparatus 6. Travelling vehicle 2 includes a plurality of wheels 3, and travels with engine 4 as the power source. Travelling vehicle 2 is provided with outrigger 5. Outrigger 5 is composed of a beam that extends in the width direction of travelling vehicle 2 and a jack cylinder that is grounded on ground surface F to support travelling vehicle 2.

Crane apparatus 6 transports lifting cargo W in a lifted state. Crane apparatus 6 includes boom 7. Wire rope 8 is provided across boom 7. Hook 9 is attached at wire rope 8 that hangs from the end portion of boom 7. In addition, winch 10 is disposed near the proximal end side of boom 7. Note that crane apparatus 6 includes cabin 11 on the lateral side of boom 7. Swinging operation tool 19, expanding/retracting operation tool 20, luffing operation tool 21, winding operation tool 22 and the like are provided inside cabin 11 (see FIG. 2).

Boom 7 is swivelable by an actuator. In the subject application, this actuator is defined as swinging motor 12. Swinging motor 12 is appropriately operated by swinging valve 23, which is an electromagnetic proportional switching valve (see FIG. 2). Specifically, swinging motor 12 appropriately operates when swinging valve 23 switches the flow rate and flow direction of the operation oil. Note that swinging valve 23 operates based on an instruction of control apparatus 18. The swinging angle of boom 7 is detected by swinging sensor 27 (see FIG. 2).

In addition, boom 7 can be extended and retracted by an actuator. In the subject application, this actuator is defined as extending/retracting cylinder 13. Extending/retracting cylinder 13 is appropriately operated by extending/retracting valve 24, which is an electromagnetic proportional switching valve (see FIG. 2). Specifically, extending/retracting cylinder 13 appropriately operates when extending/retracting valve 24 switches the flow rate and flow direction of the operation oil. Note that extending/retracting valve 24 operates based on an instruction of control apparatus 18. The expansion/retraction length of boom 7 is detected by extending/retracting sensor 28 (see FIG. 2).

Further, boom 7 can be freely raised and lowered by an actuator. In the subject application, this actuator is defined as luffing cylinder 14. Luffing cylinder 14 is appropriately operated by luffing valve 25, which is an electromagnetic proportional switching valve (see FIG. 2). Specifically, luffing cylinder 14 appropriately operates when luffing valve 25 switches the flow rate and flow direction of the operation oil. Note that luffing valve 25 operates based on an instruction of control apparatus 18. The luffing angle of boom 7 is detected by luffing sensor 29 (see FIG. 2).

Additionally, hook 9 can be rifled and lowered by the actuator. In the subject application, this actuator is defined as winding motor 15. Winding motor 15 is appropriately operated by winding valve 26, which is an electromagnetic proportional switching valve (see FIG. 2). Specifically, winding motor 15 appropriately operates when winding valve 26 switches the flow rate and flow direction of the operation oil. Note that winding valve 26 operates based on an instruction of control apparatus 18. The hanging length of hook 9 is detected by winding sensor 30 (see FIG. 2).

Incidentally, in the subject application, the XYZ coordinate system is defined with respect to crane 1. The X-axis direction (also referred to as depth direction) in the XYZ coordinate system is a direction perpendicular to the axis direction of the luffing fulcrum of boom 7 and perpendicular to the gravity direction. In addition, the Y-axis direction (also referred to as horizontal direction) in the XYZ coordinate system is a direction parallel to the axis direction of the luffing fulcrum of boom 7 and perpendicular to the gravity direction. Further, the Z-axis direction (also referred to as vertical direction) in the XYZ coordinate system is a direction perpendicular to the axis direction of the luffing fulcrum of boom 7 and parallel to the gravity direction.

Next, guide display device (guide display system) 50 according to an embodiment of the present invention is described.

Figure 2:
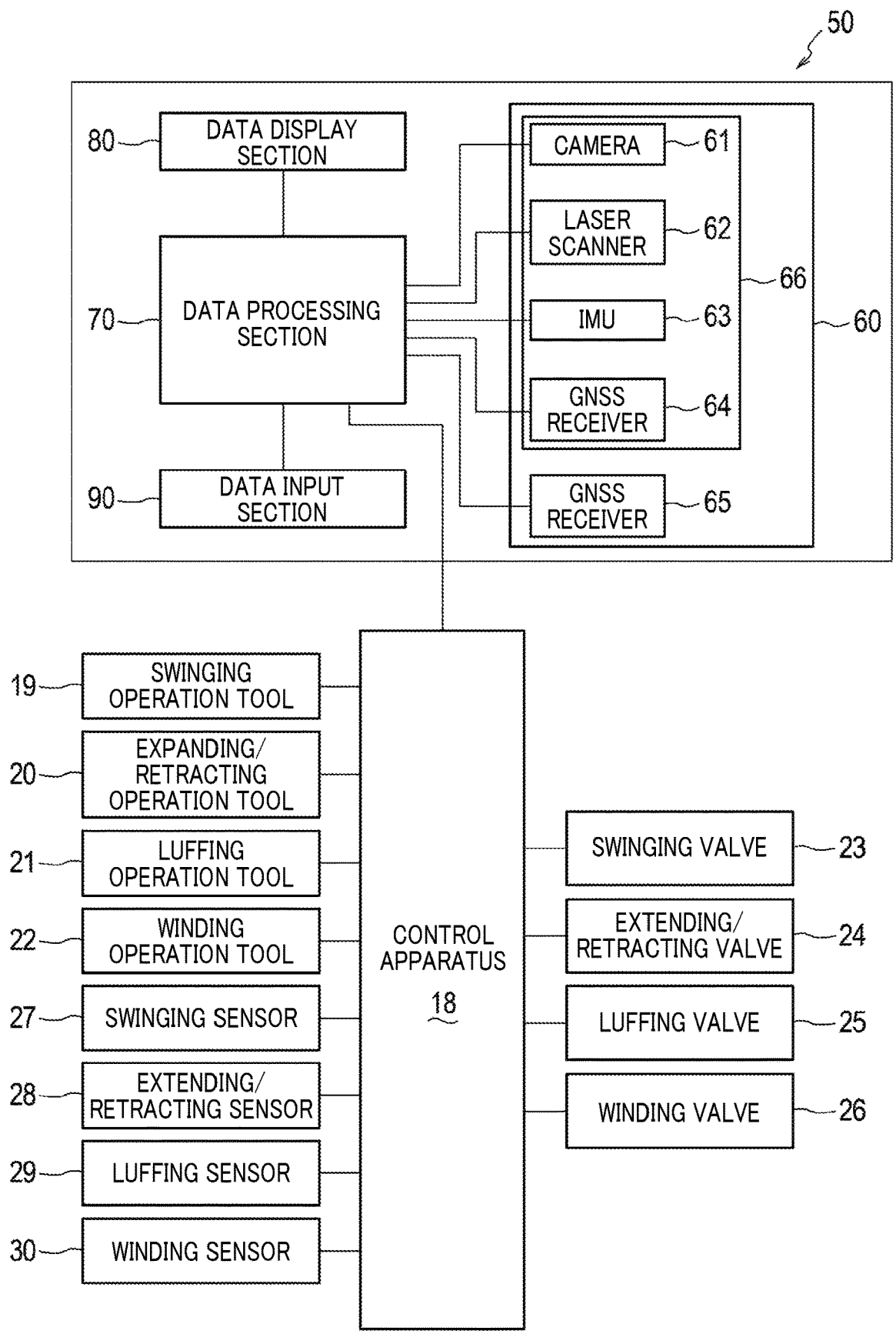
FIG. 2 is a diagram illustrating a guide display device according to an embodiment of the present invention.

As illustrated in FIG. 2, guide display device 50 is linked to control apparatus 18 of crane 1. Guide display device 50 includes data acquiring section 60, data processing section 70, data display section 80 and data input section 90.

Data acquiring section 60 acquires information required for generating guide information described later. Data acquiring section 60 includes sensor unit 66 composed of camera 61, laser scanner 62, inertia measurement unit 63 and first positioning apparatus 64 integrated with each other. Sensor unit 66 is attached at the end portion of boom 7 through a gimbal (see FIG. 1).

Camera 61 captures a part of the work area. Camera 61 outputs a captured image to data processing section 70. Note that camera 61 captures lifting cargo W and ground surface F (including ground object E) around lifting cargo W from above lifting cargo W. Thus, data processing section 70 can acquire the images of lifting cargo W and ground surface F (including ground object E) around lifting cargo W.

Figure 3A:
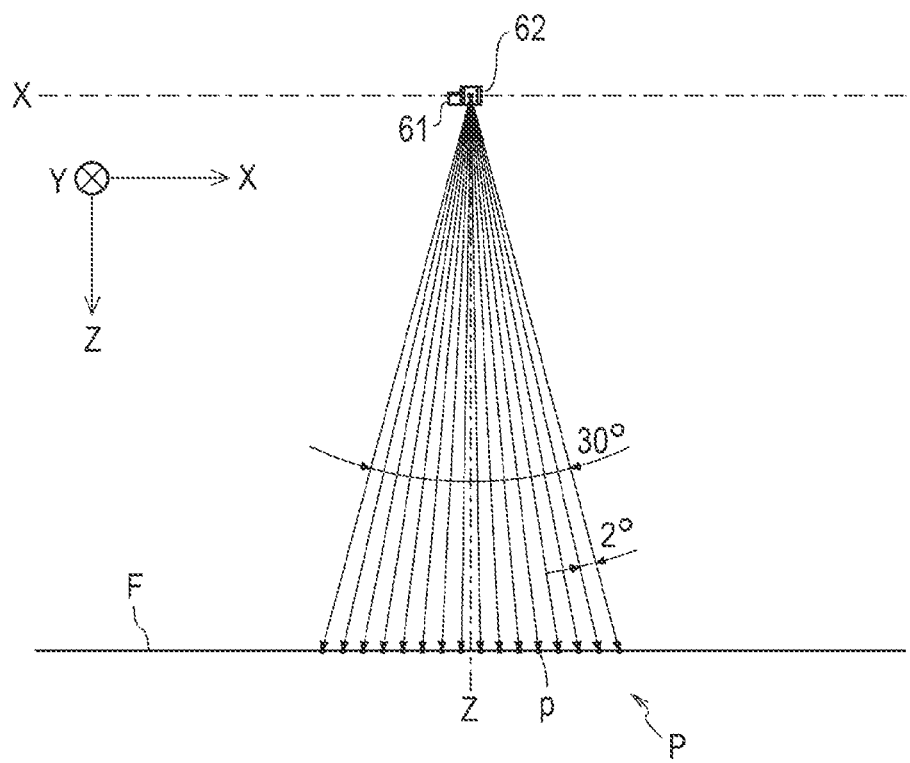
FIG. 3 is a diagram illustrating scanning with a laser scanner.
Figure 3B:
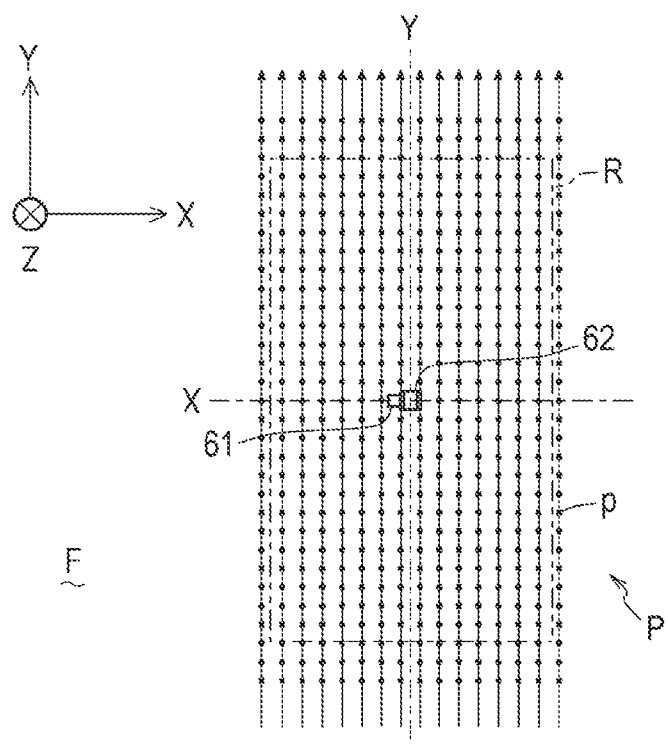

Laser scanner 62 acquires point group data P for a part of the work area (see FIG. 3). Laser scanner 62 outputs the acquired point group data P to data processing section 70. Note that laser scanner 62 scans lifting cargo W and ground surface F (including ground object E) around lifting cargo W from above lifting cargo W. Thus, data processing section 70 can acquire point group data P of lifting cargo W and ground surface F (including ground object E) around lifting cargo W.

Inertia measurement unit (hereinafter referred to as "IMU") 63 acquires information related to the posture of sensor unit 66 (more specifically, information related to the postures of camera 61 and laser scanner 62). IMU 63 outputs the acquired information related to the postures of camera 61 and laser scanner 62 to data processing section 70. Thus, data processing section 70 can acquire the information related to the postures of camera 61 and laser scanner 62.

First positioning apparatus (Global Navigation Satellite System, hereinafter referred to as "GNSS receiver") 64 acquires the latitude, the longitude and the altitude value (more specifically, the coordinate value of laser scanner 62) of sensor unit 66 by receiving radio waves emitted from the GNSS satellite. GNSS receiver 64 outputs the acquired coordinate value of laser scanner 62 to data processing section 70. Thus, data processing section 70 can acquire the coordinate value of laser scanner 62.

Additionally, in data acquiring section 60, second positioning apparatus 65 is disposed at the swinging center position of crane apparatus 6. Second positioning apparatus (Global Navigation Satellite System, hereinafter referred to as "GNSS receiver") 65 acquires the latitude, the longitude and the altitude value (more specifically, the coordinate value of the swinging center of crane apparatus 6) of the swinging center of crane apparatus 6 by receiving radio waves emitted from the GNSS satellite. GNSS receiver 65 outputs the acquired swinging center coordinate value to data processing section 70. Thus, data processing section 70 can acquire the coordinate value of the swinging center of crane apparatus 6.

In this manner, with the coordinate value of laser scanner 62 and the coordinate value of the swinging center of crane apparatus 6, guide display device 50 makes up a GNSS compass with boom 7 as the bassline. Thus, data processing section 70 can calculate the orientation of laser scanner 62. In addition, in guide display device 50, it is preferable that the measurement time of IMU 63 and point group data P be synchronized at the time of the atomic clock of the GNSS satellite (hereinafter referred to as "GNSS time"). Note that GNSS receiver 64 and GNSS receiver 65, with high measurement accuracy real time kinematic (RTK) positioning system employ. It should be noted that the RTK positioning system is not limitative, and other positioning systems may be employed.

Data processing section 70 is connected to data acquiring section 60, and performs various processes. Data processing section 70 is composed of a general-purpose computer, for example. Note that data processing section 70 is disposed near sensor unit 66. It should be noted that data processing section 70 may be disposed at other locations such as inside cabin 11. Naturally, it may be portable.

Data display section 80 is connected to data processing section 70, and displays various information. Data display section 80 is composed of a general-purpose monitor, for example. Note that data display section 80 is disposed inside cabin 11. Thus, the information can be provided to the operator of crane 1. Naturally, in the case where data processing section 70 is portable or the like, it may be an integrated monitor.

Data input section 90 is connected to data processing section 70, and configured to input various numerical values or change the setting. Data input section 90 is composed of a general-purpose keyboard, mouse, or touch panel. Note that data input section 90 is also disposed inside cabin 11. Thus, the operator of crane 1 can freely input numerical values or change the setting. Naturally, in the case where data processing section 70 is portable or the like, it may be an integrated keyboard, mouse, or touch panel.

Next, scanning with laser scanner 62 is described.

As illustrated in FIG. 3, laser scanner 62 irradiates ground surface F with laser light from above. Laser scanner 62 includes a plurality of laser transmitters and laser receivers, and can simultaneously emit a plurality of laser beams and simultaneously acquire a plurality of pieces of point data p (a set of point data p is point group data P).

To be more specific, laser scanner 62 includes a total of 16 laser transmitters, and can simultaneously emit 16 laser beams. The irradiation angles of the laser transmitters are different from each other by 2 degrees around in the Y-axis direction. In addition, the laser transmitters are configured to be able to perform the emission while continuously changing the phase angle around the X axis. Thus, laser scanner 62 can irradiate a predetermined range of ground surface F with laser light.

Further, laser scanner 62 includes a total of 16 laser receivers, and can simultaneously detect reflection light of 16 laser beams. The irradiation angles of the laser receivers are different from each other by 2 degrees around the Y-axis direction. In addition, each laser receiver is configured to be able to detect the reflection light at the same light path as that of the laser light transmitted from the laser transmitter. In this manner, laser scanner 62 can acquire point group data P covering ground surface F. Note that the range where point group data P can be acquired includes measurement region R, which is the range captured by camera 61.

With this configuration, data processing section 70 can acquire point group data P for the range including measurement region R. Laser scanner 62 scans lifting cargo W and ground surface F (including ground object E) around lifting cargo W from above lifting cargo W. and thus point group data P indicates lifting cargo W, ground surface F, and ground object E (see FIG. 8B). Various information acquired by IMU 63 and GNSS receivers 64 and 65 is added to each point data p making up point group data P. Examples of such information include posture information and location information.

Next, a procedure of a process of data processing section 70 is described.

Figure 4:
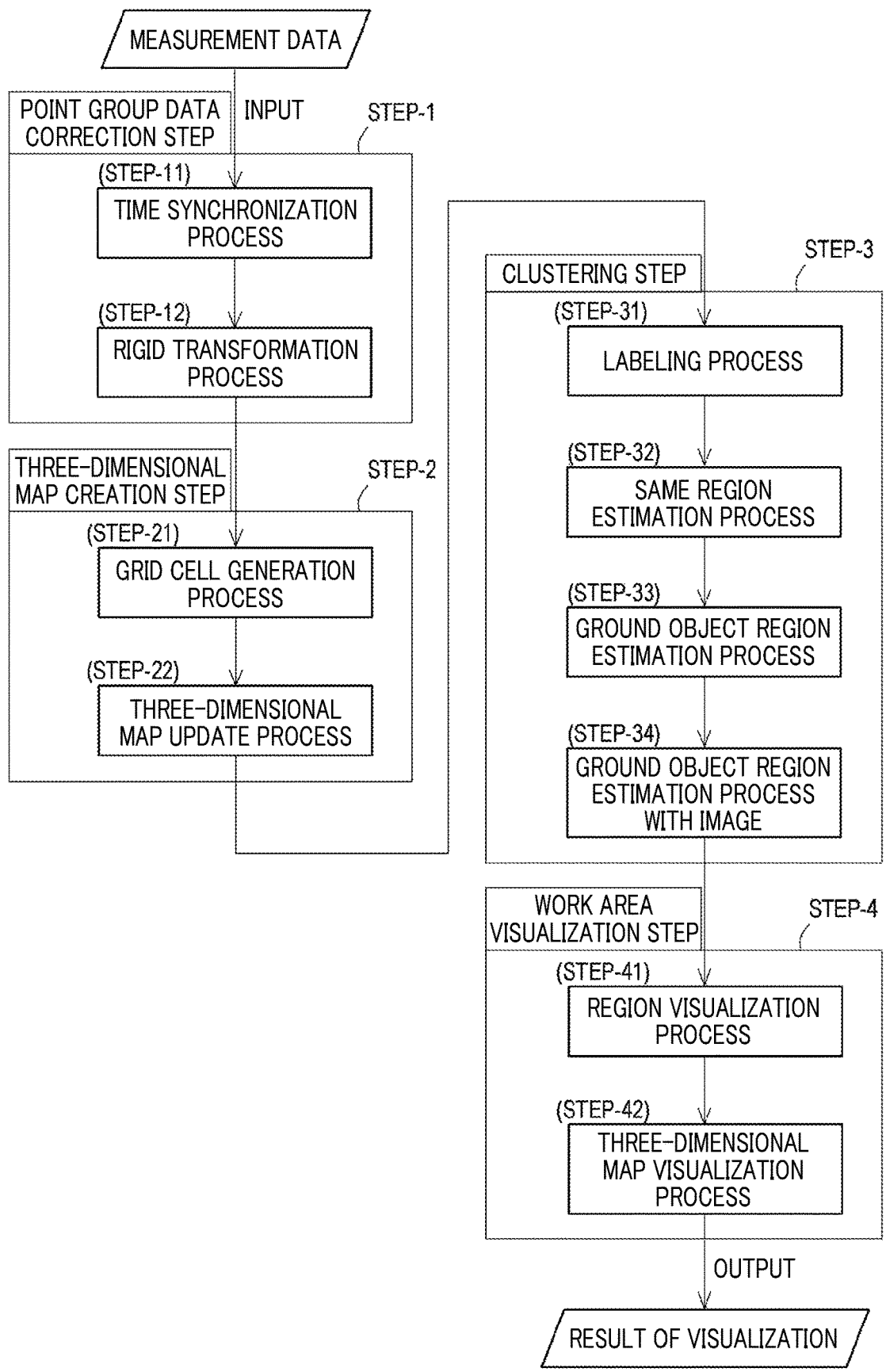
FIG. 4 is a flow chart illustrating a procedure of a process of a data processing section.

As illustrated in FIG. 4, data processing section 70 performs point group data correction step STEP-1, three-dimensional map creation step STEP-2, clustering step STEP-3 and work area visualization step STEP-4. These steps are repeated at predetermined time intervals.

Figure 5:
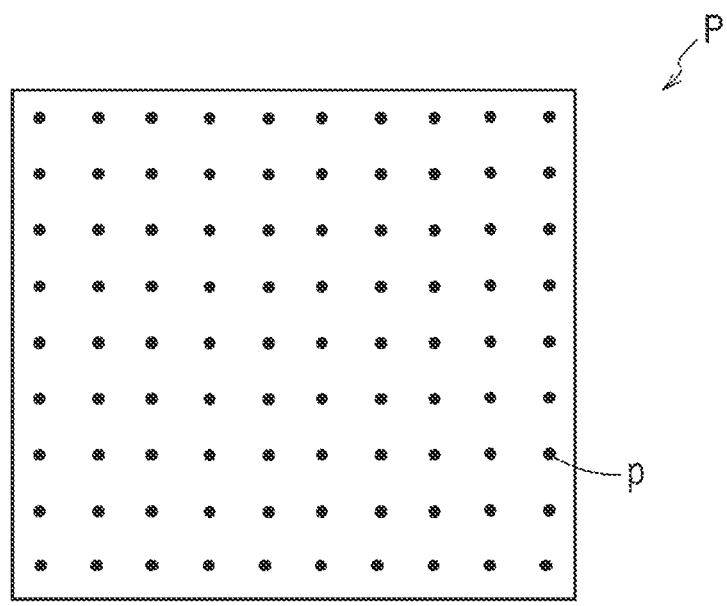
FIG. 5 is a diagram illustrating an overview of a point group data correction step.

At point group data correction step STEP-1, the point group data P, posture information and location information of the time point closest to the current time are acquired on the basis of the information of laser scanner 62, IMU 63 and GNSSs 64 and 65, and the orientation of laser scanner 62 is calculated. Then, by using the posture information, location information and orientation, the position and inclination of point group data P are corrected, and are output as corrected point group data P (see FIG. 5).

To be more specific, point group data correction step STEP-1 is composed of time synchronization process STEP-11 and rigid transformation process STEP-12.

At time synchronization process STEP-11, at the time closest to the current time, the information of IMU 63, GNSSs 64 and 65 and laser scanner 62 that has run from one end to the other in measurement region R are synchronized at the GNSS time. Then, the combination of the synchronized point data p, posture information, and location information are output.

At rigid transformation process STEP-12, one combination of the synchronized point data p, posture information, and location information is acquired. Then, rigid transformation of the coordinate value of point data p is performed by using the acquired posture information, the coordinate system of point data p is converted into a plane right angle coordinate system, and point group data P with the corrected inclination, position and orientation is output.

Figure 6A:
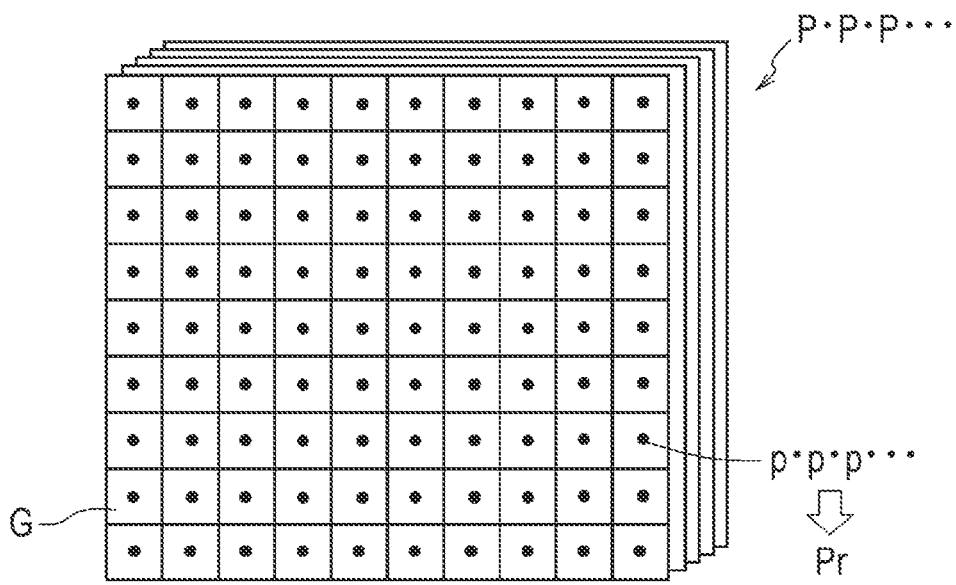
FIG. 6 is a diagram illustrating an overview of a three-dimensional map creation step.
Figure 6B:
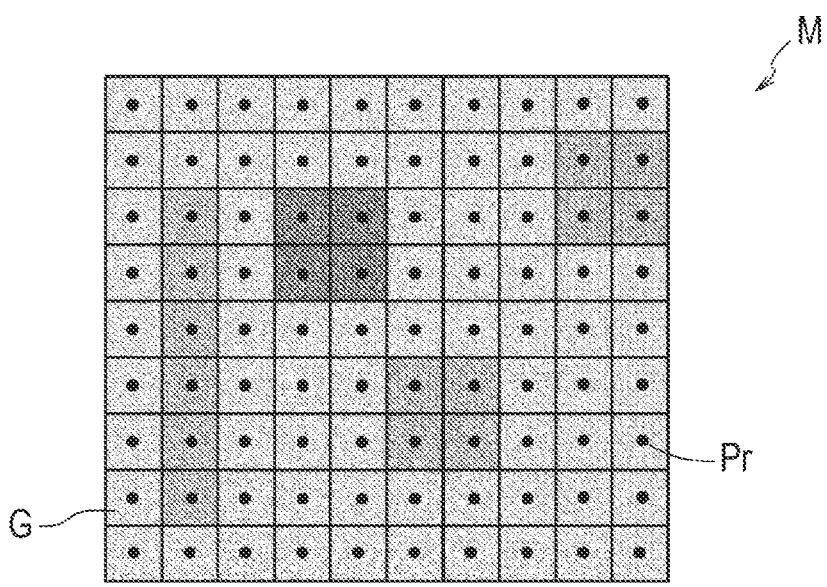

At three-dimensional map creation step STEP-2, corrected point group data P acquired at different times and positions are superimposed on one another and divided into grid cells G of a grid form (a region divided into a grid including a plurality of pieces of point data p), and representative point Pr is calculated for each grid cell G (see FIG. 6A). Then, a plane is generated based on representative point Pr, and output as three-dimensional map M of the work area (see FIG. 6B).

To be more specific, three-dimensional map creation step STEP-2 is composed of grid cell generation process STEP-21 and three-dimensional map update process STEP-22.

At grid cell generation process STEP-21, corrected point group data P is superimposed on one another and divided into grid cells G of a grid form. Then, the average value of the altitude value of point data p included in grid cell G (the height component of the coordinate value) is calculated, and representative point Pr with the average height component value is calculated at the gravity center of grid cell G.

At three-dimensional map update process STEP-22, representative point Pr calculated anew for each grid cell G is acquired. In addition, existing representative point Pr calculated at the last time is also acquired. Then, when representative point Pr calculated anew and existing representative point Pr are different from each other, a plane based on representative point Pr calculated anew is generated and three-dimensional map M is output. In existing representative point Pr acquired at this time, the processing result of the ground object region estimation process with an image (STEP-34) described later is reflected, and ground object E estimated at STEP-34 is reflected to three-dimensional map M.

Figure 7A:
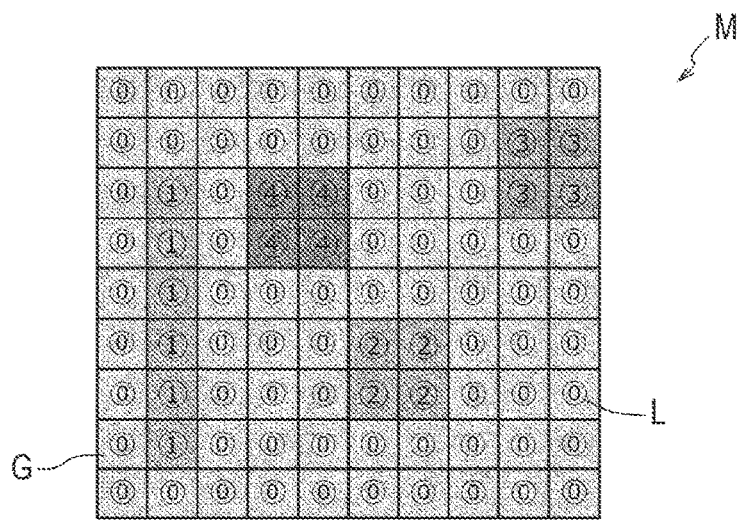
FIG. 7 is a diagram illustrating an overview of a clustering step.
Figure 7B:
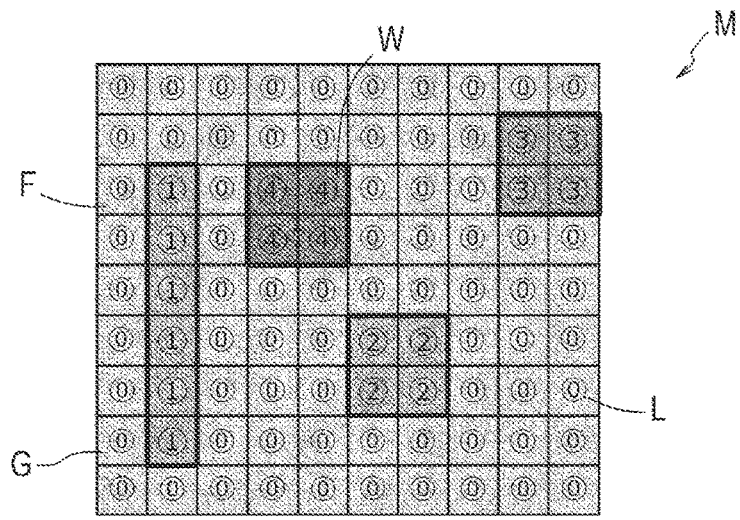
Figure 7C:
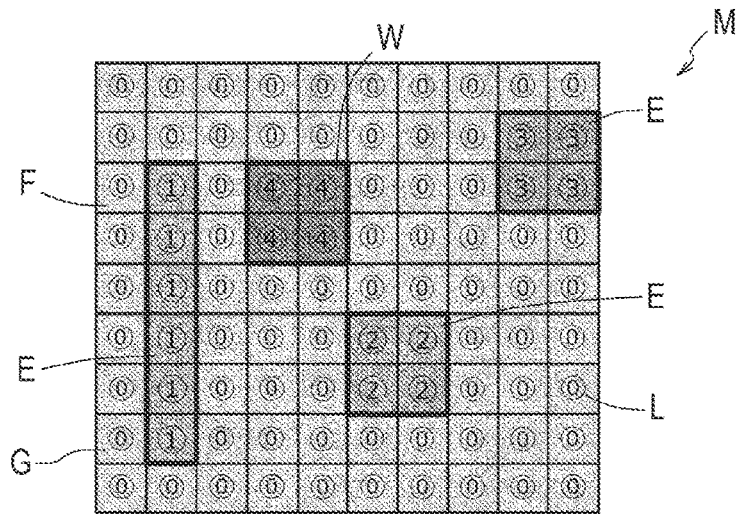

At clustering step STEP-3, label L is provided to the identification region on the basis of the relationship of the height components of representative points Pr regarding representative points Pr of adjacent grid cells G on the upper, lower, left and right sides (see FIG. 7A). Note that the circled numbers illustrated in FIG. 7A and the like represent labels L. Then, among the identification regions provided with the same label L, the identification region corresponding to lifting cargo W is output as lifting cargo W, and the identification region corresponding to ground surface F is output as ground surface F (see FIG. 7B). Further, the other identification regions are output as ground object E (see FIG. 7C).

To be more specific, clustering step STEP-3 is composed of labeling process STEP-31, same region estimation process STEP-32, ground object region estimation process STEP-33, and ground object region estimation process with image STEP-34.

At labeling process STEP-31, grid cells G arranged in a grid are assumed to be pixels. In addition, the height component of representative point Pr in each grid cell G is assumed to be the luminance value. Further, the luminance values of adjacent grid cells G on the upper, lower, left and right sides are compared with each other based on a predetermined rule, and label L is provided to the identification region.

At same region estimation process STEP-32, the identification regions provided with the same label L are assumed to be one flat surface. Further, the identification region manually selected by the operator from among the identification regions provided with the same label L is output as lifting cargo W. In addition, the identification region with a largest number of pieces of point data p is output as ground surface F.

At ground object region estimation process STEP-33, whether a region other than the identification regions set as lifting cargo W and ground surface F is ground object E is determined. Details of the procedure of the process will be described later.

At ground object region estimation process with image STEP-34, for the region set as ground surface F at ground object region estimation process STEP-33, whether the determination region is ground object E is again determined on the basis of the image data obtained by capturing the region with camera 61. Details of the procedure of the process will be described later.

Figure 8A:
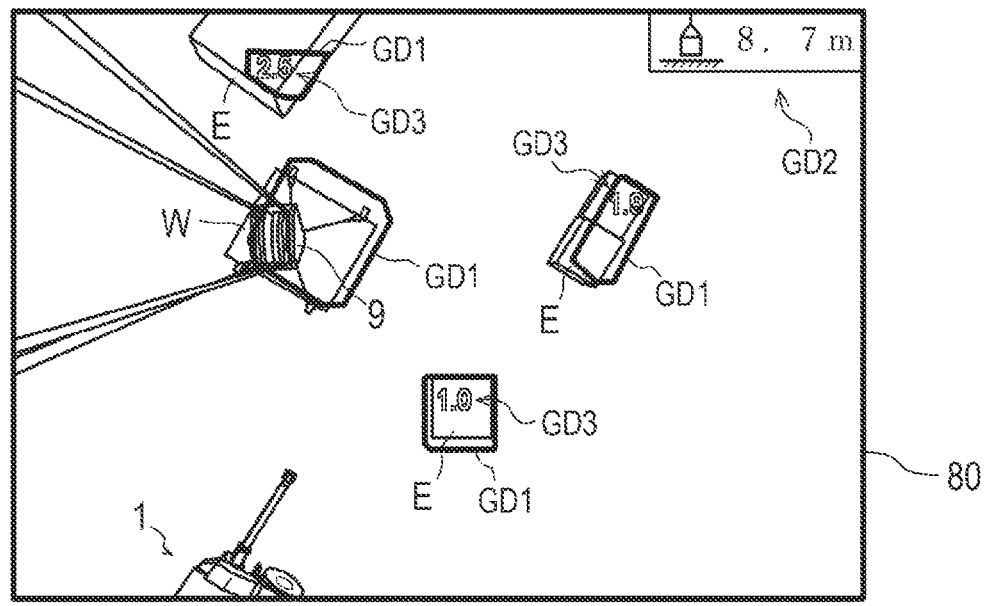
FIG. 8 is a diagram illustrating an overview of a work area visualization step.

At work area visualization step STEP-4, guide information such as guide frame diagram GD1 that surrounds lifting cargo W and ground object E (including numerical values GD2 and GD3 representing the altitude) is generated, the guide information is superimposed on the image captured with camera 61, and output to data display section 80 (see FIG. 8A). In addition, three-dimensional map M representing the three-dimensional positional relationship of lifting cargo W, ground surface F and ground object E is visualized and output (see FIG. 8B).

To be more specific, work area visualization step STEP-4 is composed of region visualization process STEP-41 and three-dimensional map visualization process STEP-42.

At region visualization process STEP-41, the positions of lifting cargo W and ground object E on the image are calculated on the basis of the position and orientation of laser scanner 62. Then, guide frame diagram GD1 that surrounds lifting cargo W and ground object E is generated, and guide frame diagram GD1 is output in a superimposed manner on lifting cargo W and ground object E in the image captured with camera 61. In addition, numerical value GD2 representing the altitude of lifting cargo W and numerical value GD3 representing the altitude of ground object E are also output.

At three-dimensional map visualization process STEP-42, for lifting cargo W, ground surface F and ground object E provided with label L, the coordinate value of representative point Pr is acquired for each grid cell G. Then, a plane with representative point Pr as the center of gravity is generated for each grid cell G. At this time, the width of one side of the plane is the same as the width of grid cell G. Thereafter, each of lifting cargo W, ground surface F and ground object E is colored so as to visualize it as three-dimensional map M.

Next, a procedure of three-dimensional map update process STEP-22 is described.

As described above, data processing section 70 performs three-dimensional map update process STEP-22 at three-dimensional map creation step STEP-2.

Figure 9:
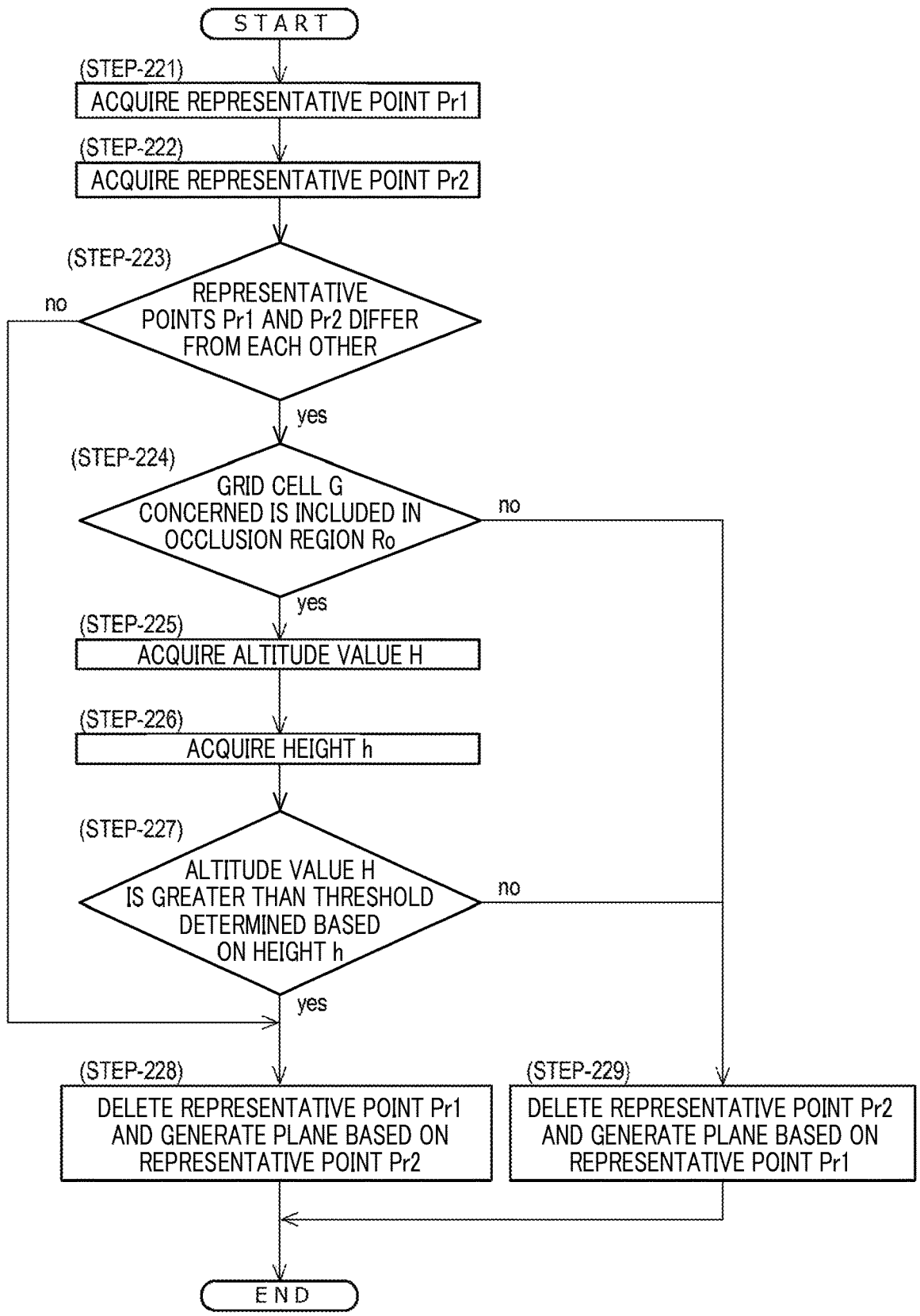
FIG. 9 is a flow chart illustrating a three-dimensional map update process.

As illustrated in FIG. 9, three-dimensional map update process STEP-22 is composed of a plurality of processes performed for each grid cell G. The procedure of the process described below is an example employed for this guide display device 50. It should be noted that the procedure of the process is not limitative as long as the invention described in the subject application can be achieved.

Figure 10A:
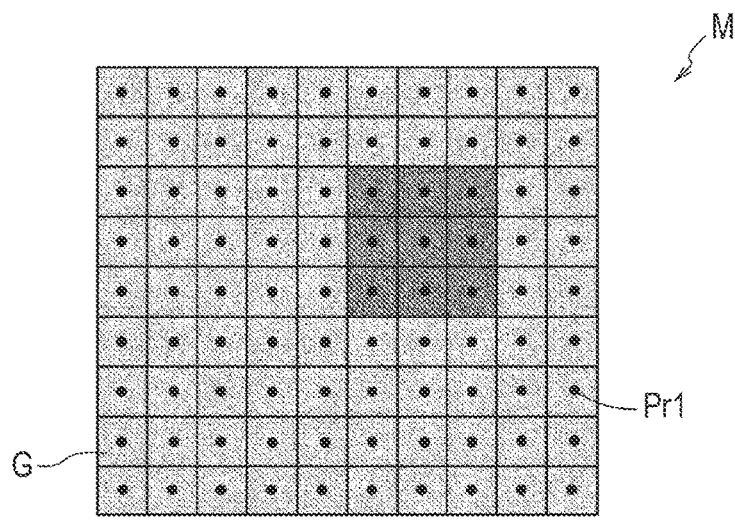
FIG. 10 is a diagram illustrating an overview of the three-dimensional map update process.

At first process STEP-221, data processing section 70 acquires the newest representative point Pr1 in grid cell G (see FIG. 10A). The "representative point Pr1" means representative point Pr calculated at the time closest to the current time. After representative point Pr1 is acquired, the process proceeds to second process STEP-222.

Figure 10B:
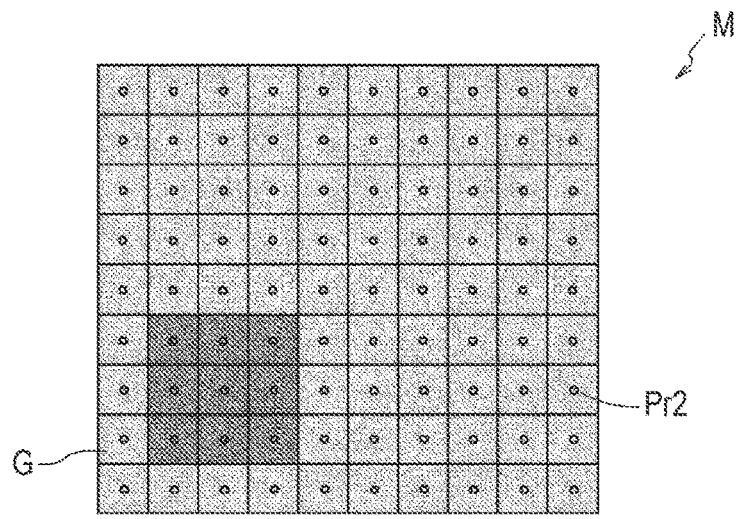

At second process STEP-222, data processing section 70 acquires the existing representative point Pr2 in grid cell G (see FIG. 10B). The "representative point Pr2" means representative point Pr that is calculated before representative point Pr1 is calculated. After representative point Pr2 is acquired, the process proceeds to third process STEP-223. In the "representative point Pr2" acquired here, the processing result of ground object region estimation process with image STEP-34 described later is reflected.

At third process STEP-223, data processing section 70 determines whether the newest representative point Pr1 and the existing representative point Pr2 are different from each other. When representative point Pr1 and representative point Pr2 are different from each other, the process proceeds to fourth process STEP-224, whereas when representative point Pr1 and representative point Pr2 are not different from each other, the process proceeds to eighth process STEP-228.

Figure 15:
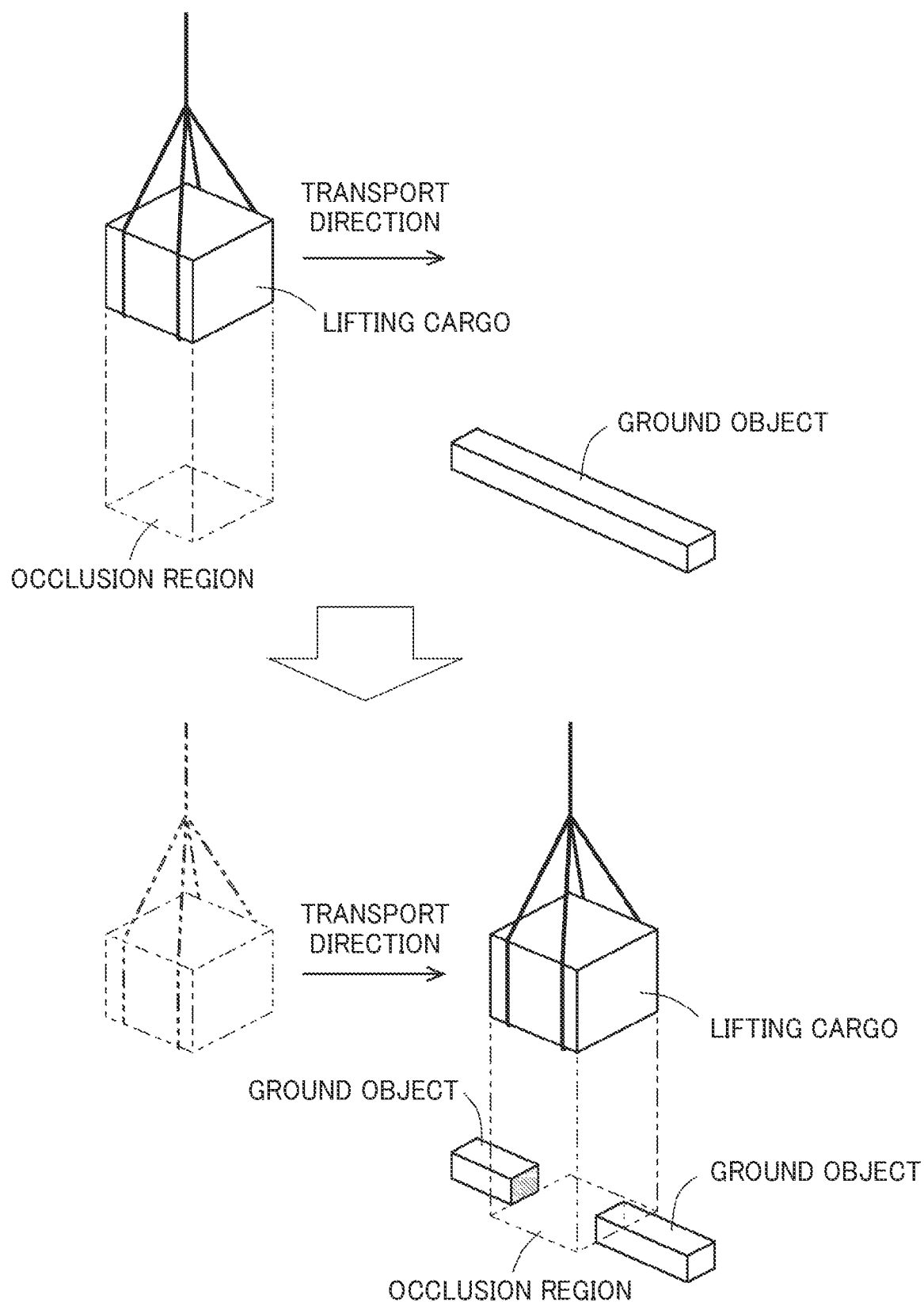
FIG. 15 is a diagram illustrating a situation where erroneous recognition is caused due to generation of an occlusion region.

At fourth process STEP-224, data processing section 70 determines whether grid cell G concerned is included in occlusion region. Ro. Here, the "occlusion region" is a region in the shadow of the lifting cargo as illustrated in FIG. 15. When grid cell G is included in occlusion region Ro, the process proceeds to fifth process STEP-225, whereas when grid cell G is not included in occlusion region Ro, the process proceeds to ninth process STEP-229.

Figure 8B:
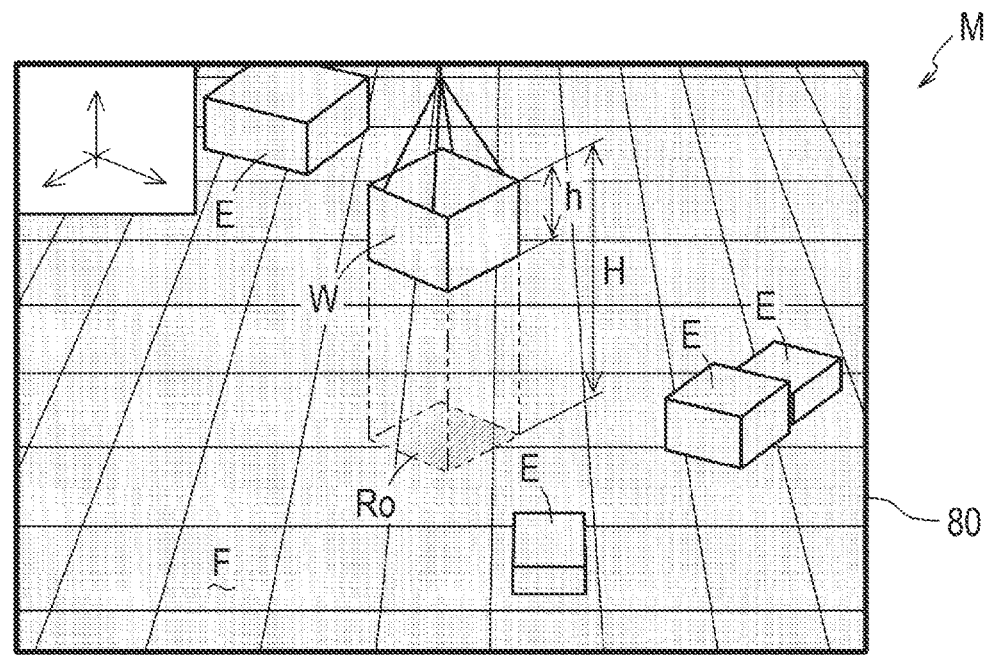

At fifth process STEP-225, data processing section 70 acquires the altitude value H of lifting cargo W (see FIG. 8B). Specifically, the distance from occlusion region Ro to the top surface of lifting cargo W is acquired. After altitude value H is acquired, the process proceeds to sixth process STEP-226.

At sixth process STEP-226, data processing section 70 acquires height h of lifting cargo W (see FIG. 8B). Height h of lifting cargo W corresponds to an altitude value passed on from the state where lifting cargo W is placed on ground surface F (the state where it is ground object E). After height h is acquired, the process proceeds to seventh process STEP-227.

At seventh process STEP-227, data processing section 70 determines whether altitude value H of lifting cargo W is greater than a threshold value (in this guide display device 50, a value equal to height h) determined based on height h of lifting cargo W. When altitude value H is greater than the threshold value, the process proceeds to eighth process STEP-228, whereas when altitude value H is not greater than the threshold value, the process proceeds to ninth process STEP-229.

Figure 10C:
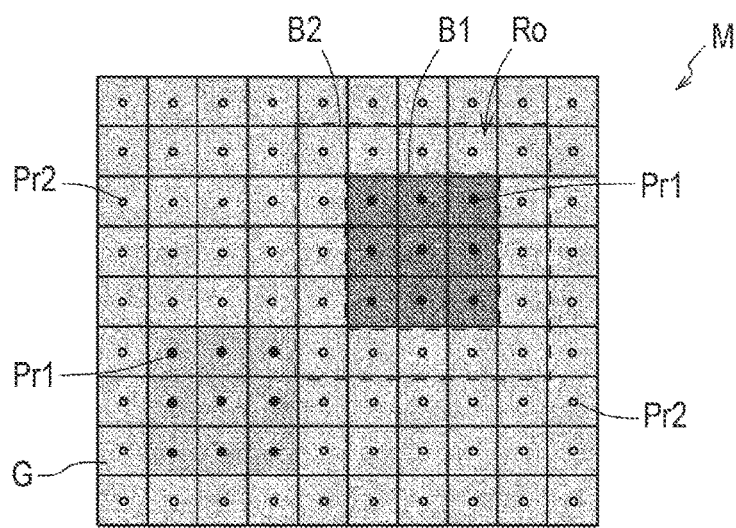
Figure 11:
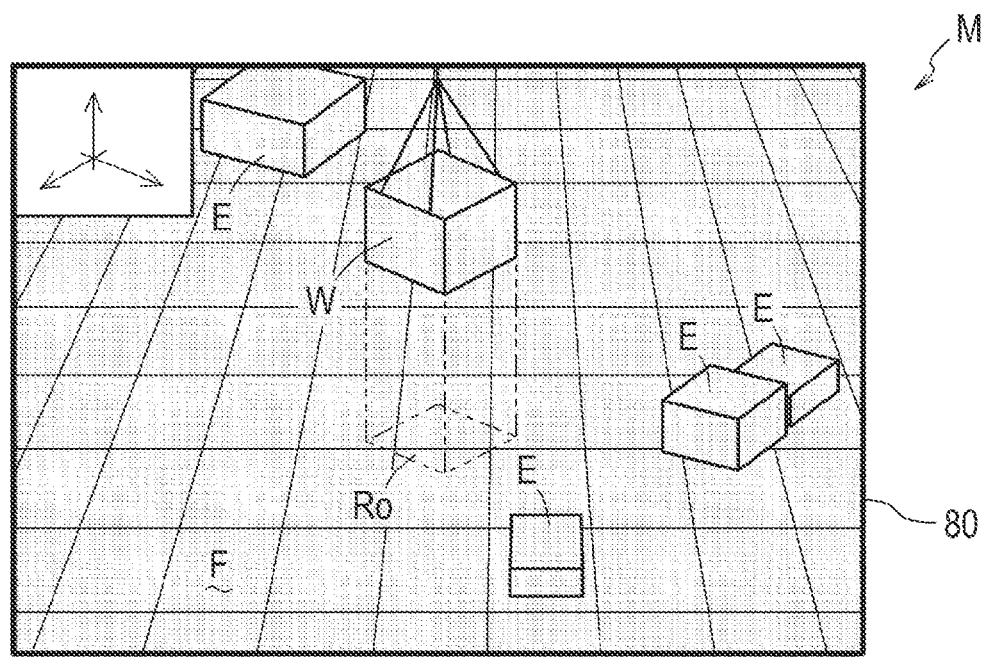
FIG. 11 is a diagram illustrating a three-dimensional map created through the three-dimensional map update process.

At eighth process STEP-228, data processing section 70 deletes representative point Pr1 in grid cell G concerned (see FIG. 10C). Then, in grid cell G concerned, a plane is generated on the basis of the existing representative point Pr2. In this manner, the update is not performed when the newest representative point Pr1 and the existing representative point Pr2 are not different from each other. In addition, even when the newest representative point Pr1 and the existing representative point Pr2 are different from each other, the update is not performed when grid cell G is included in occlusion region Ro and altitude value H of lifting cargo W is greater than a threshold value determined based on height h of lifting cargo W.

On the other hand, at ninth process STEP-229, data processing section 70 deletes representative point Pr2 in grid cell G concerned (see FIG. 10C). Then, in grid cell G concerned, a plane is generated on the basis of the newest representative point Pr1. In this manner, the update is performed when the newest representative point Pr1 and the existing representative point Pr2 are different from each other and grid cell G is not included in occlusion region Ro. In addition, even when the newest representative point Pr1 and the existing representative point Pr2 are different from each other and grid cell G is included in occlusion region Ro, the update is performed when altitude value H of lifting cargo W is not greater than the threshold value determined based on height h of lifting cargo W.

As described above, when occlusion region Ro, which is the shadow of lifting cargo W, is generated in three-dimensional map M, guide display device 50 does not perform the update for occlusion region Ro even when the representative point Pr1 calculated anew and existing representative point Pr are different from each other, and, when occlusion region Ro is generated, guide display device 50 does not erroneously recognize the same ground object E as a plurality of different ground objects E or as ground surface F (see FIG. 13). Additionally, when altitude value H of lifting cargo W is greater than a threshold value determined based on height h of lifting cargo W, guide display device 50 does not perform the update for occlusion region Ro even when the representative point Pr1 calculated anew and the existing representative point Pr2 are different from each other.

Data processing section 70 recognizes a wide region including the shadow of lifting cargo W as occlusion region Ro. To be more specific, data processing section 70 specifies boundary line B1 of grid cell G corresponding to the outer edge of lifting cargo W, and specifies boundary line B2 separated from boundary line B1 on the outside by one or a plurality of grid cells G (see FIG. 10C). Then, the region surrounded by boundary line B2 is recognized as occlusion region Ro. In guide display device 50, the region located on the outside with a predetermined distance from the outer edge of lifting cargo W is recognized as occlusion region Ro, and thus the accuracy of the region around lifting cargo W in three-dimensional map M is improved even when lifting cargo W is being transported and/or swayed.

Next, a procedure of same region estimation process STEP-32 is described.

As described above, data processing section 70 performs same region estimation process STEP-32 at clustering step STEP-3.

Figure 12:
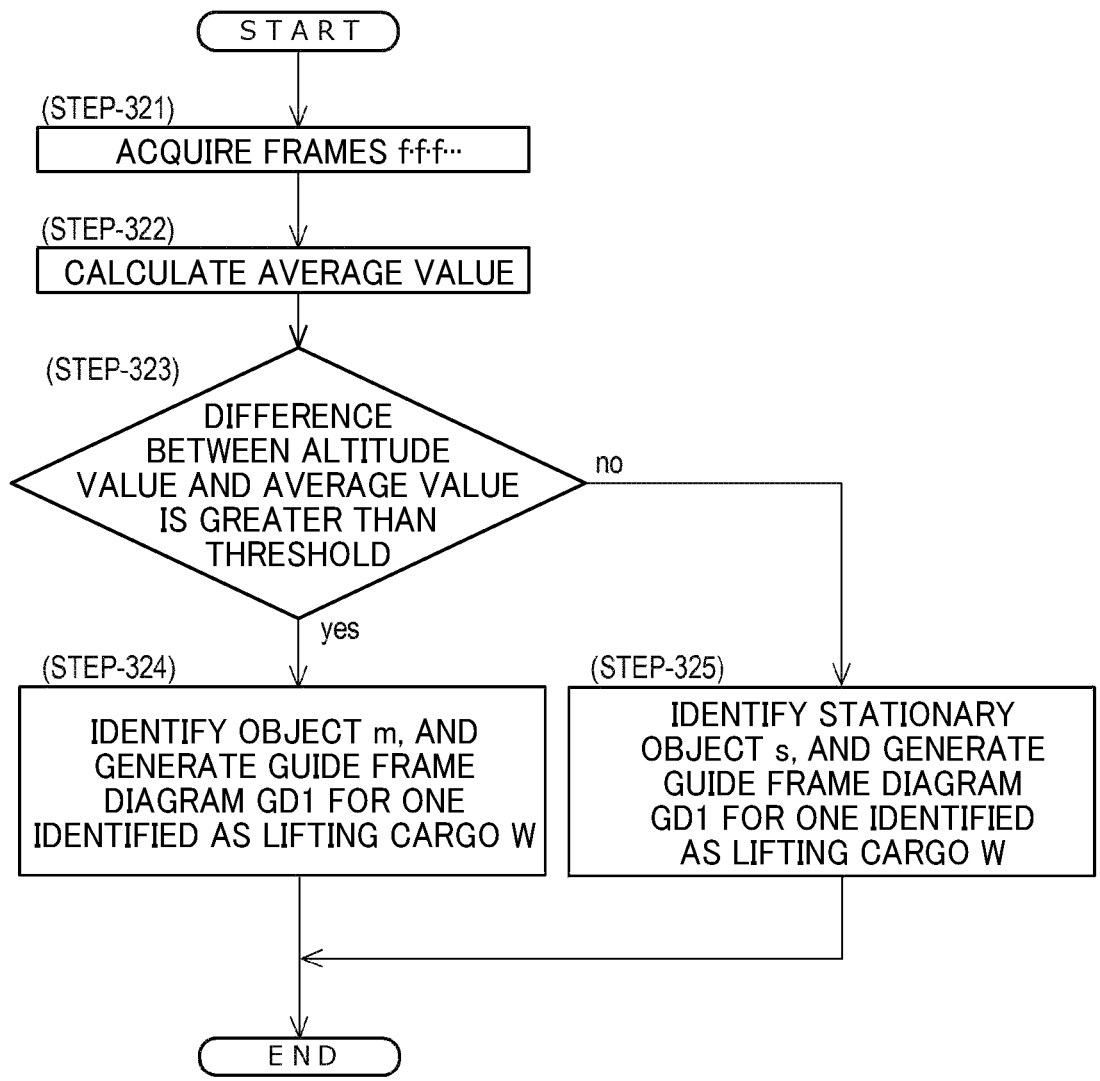
FIG. 12 is a flow chart illustrating a procedure of a same region estimation process.

As illustrated in FIG. 12, same region estimation process STEP-32 is composed of a plurality of processes performed for each grid cell G. The procedure of the process described below is an example employed for guide display device 50. It should be noted that the procedure of the process is not limitative as long as the invention described in the subject application can be achieved.

Figure 13A:
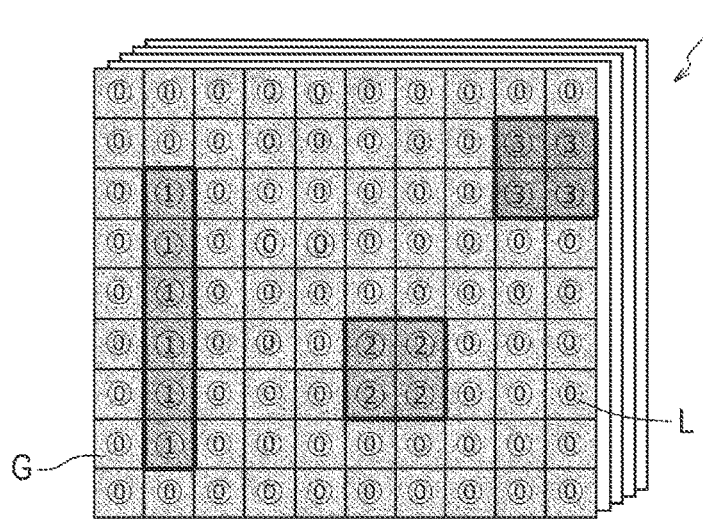
FIG. 13 is a diagram illustrating an overview of the same region estimation process.

At first process STEP-321, data processing section 70 acquires a plurality of frames f·f·f . . . aligned in a time-series manner (see FIG. 13A). The "frame I" means three-dimensional map M created based on point group data P of a certain time point. After frame f is acquired, the process proceeds to second process STEP-322.

Figure 13B:
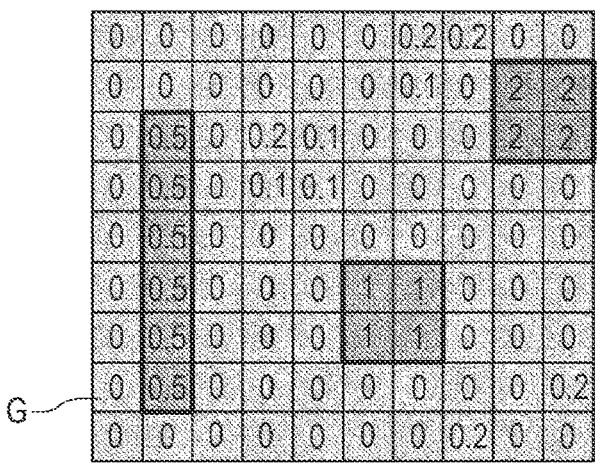

At second process STEP-322, data processing section 70 calculates the average value of the altitude value for each grid cell G7 for the identification regions provided with the same label L of each frame f (see FIG. 13B). In guide display device 50, such an average value is represented by the first decimal digit. After the average value has been calculated, the process proceeds to third process STEP-323.

At third process STEP-323, data processing section 70 determines whether the difference between the altitude value and the average value in the identification region of newest frame f is greater than a threshold value. When the difference is greater than the threshold value, the process proceeds to fourth process STEP-324, whereas when the difference is not greater than the threshold value, the process proceeds to fifth process STEP-325.

Figure 13C:
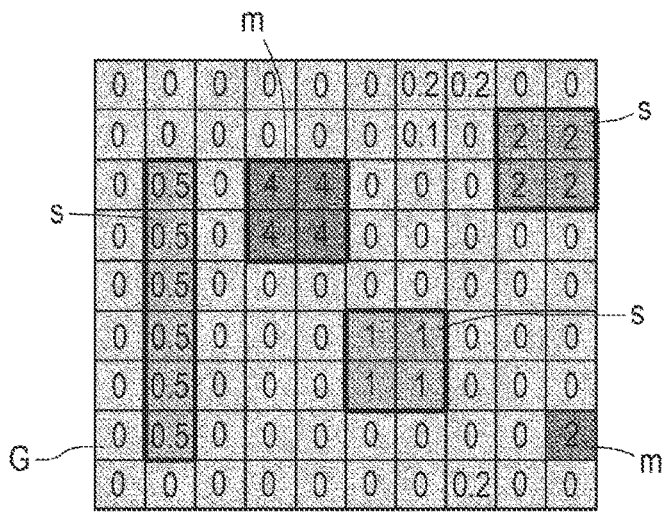

At fourth process STEP-324, data processing section 70 identifies the identification region concerned as moving object m (see FIG. 13C). Note that in some situation such an identification region includes lifting cargo W. Lifting cargo W is the identification region selected by the operator through the manual operation, and therefore can be discriminated. In this manner, lifting cargo W that is being transported can be tracked without losing it, and guide frame diagram GD1 surrounding lifting cargo W can be moved in accordance with the transport of lifting cargo W.

On the other hand, at fifth process STEP-325, data processing section 70 identifies the identification region concerned as stationary object s (see FIG. 13C). In some situation such an identification region includes lifting cargo W. Lifting cargo W is the identification region selected by the operator through the manual operation, and therefore can be discriminated. In this manner, lifting cargo W whose transport is stopped can also be tracked without losing it, and guide frame diagram GD1 surrounding lifting cargo W can be stopped in accordance with the stop of lifting cargo W.

Incidentally, at same region estimation process STEP-32, a situation is anticipated where lifting cargo W cannot be tracked (including a situation where the position of lifting cargo W cannot be correctly identified) due to some reasons such as when the number of pieces of point data p of the captured top surface of lifting cargo W is small.

Figure 14:
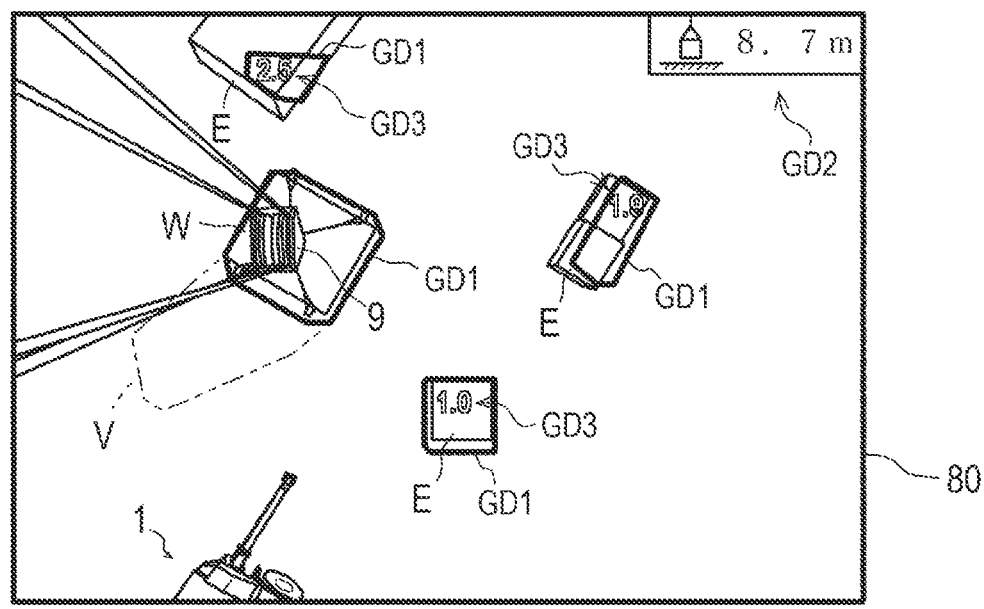
FIG. 14 is a diagram illustrating guide information generated through the same region estimation process.

In such a situation, the same process is performed after label L of the identification region corresponding to lifting cargo W is deleted from past frames f·f·f . . . excluding the newest frame f. In this manner, creation of three-dimensional map M reflecting lifting cargo W in past frames f·f·f . . . can be prevented. In turn, generation of guide frame diagram GD1 in a size greater than the actual shape of lifting cargo W (see chain double-dashed line V in FIG. 14) can be prevented.

In this manner, when lifting cargo W cannot be tracked in current frame f, guide display device 50 deletes lifting cargo W from past frames f·f·f . . . and updates three-dimensional map M. With this guide display device 50, the accuracy of the top surface shape of lifting cargo W in three-dimensional map M can be improved (in turn, guide frame diagram GD1 generated based on three-dimensional map M corresponds to the top surface shape of lifting cargo W; see FIG. 14) even when lifting cargo W is being transported and/or swayed, while achieving the above-described effects.

Additionally, guide display device 50 displays the guide information (such as guide frame diagram GD1) generated based on three-dimensional map M in a superimposed manner on the image captured with camera 61 on data display section 80. With this guide display device 50, highly accurate guide information (such as guide frame diagram GD1 and numerical values GD2 and GD3 representing altitudes) can be presented to the operator together with images while achieving the above-described effects.

Next, a procedure of ground object region estimation process STEP-33 and ground object region estimation process with image STEP-34 is described.

Figure 16:
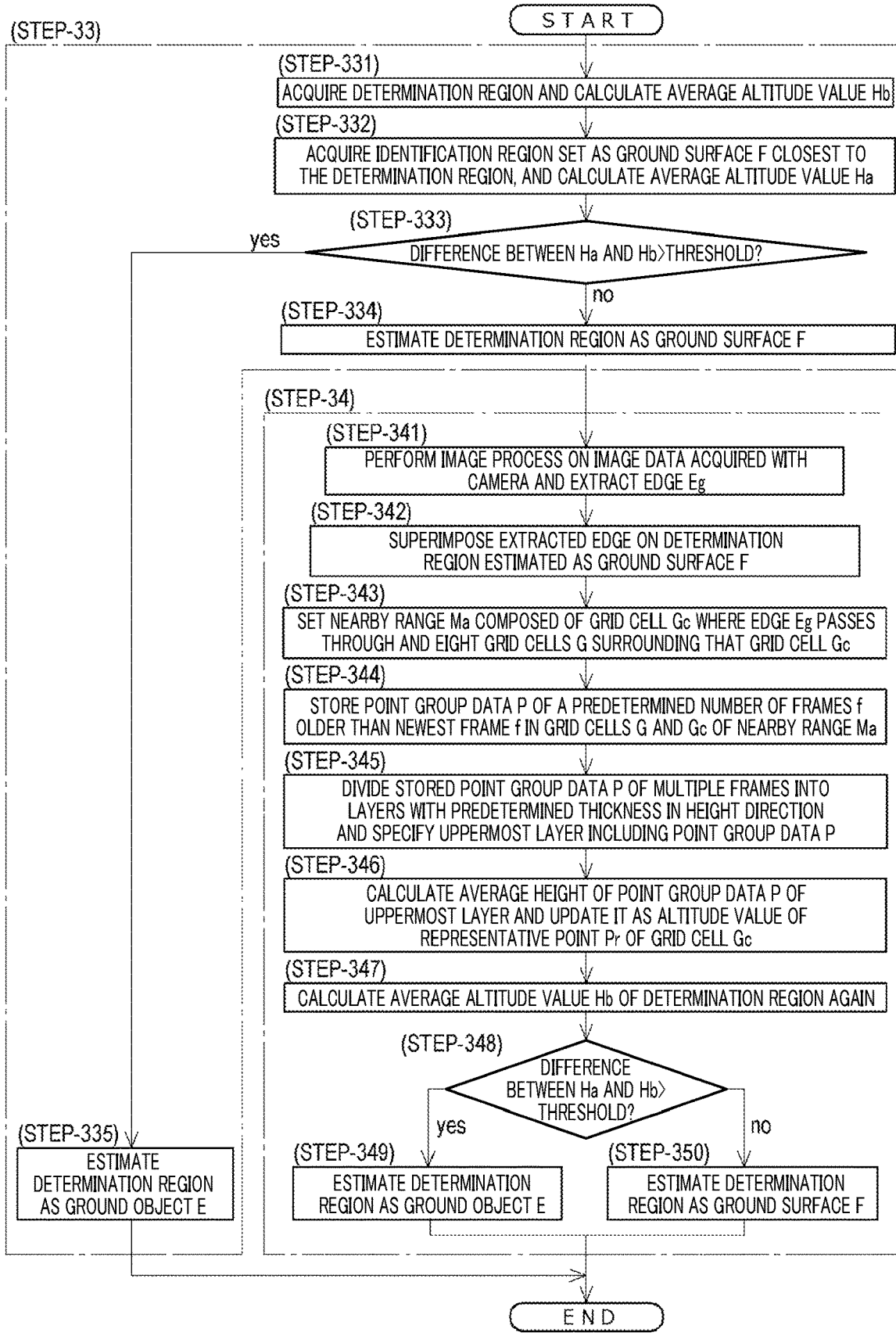
FIG. 16 is a flow chart illustrating a ground object region estimation process and a ground object region estimation process with an image.

As illustrated in FIG. 16, data processing section 70 performs ground object region estimation process STEP-33 at clustering step STEP-3.

At ground object region estimation process STEP-33, first, the region other than the identification regions set as lifting cargo W and ground surface F is set as a region (hereinafter referred to as determination region) for determining whether it is a ground object region (the region where ground object E is present), a set of representative points Pr in the determination region is acquired, and average altitude value Hb, which is the average value of the height components of representative points Pr included in the determination region, is calculated (STEP-331).

Next, the identification region set as ground surface F closest to the determination region is acquired, and average altitude value Ha, which is the average value of the height components of representative points Pr included in the identification region, is calculated (STEP-332).

Then, data processing section 70 performs determination based on the difference between average altitude value Ha and average altitude value Hb (STEP-333). When the difference between average altitude value Ha and average altitude value Hb is greater than a predetermined threshold value, the determination region is estimated as ground object E (STEP-335). On the other hand, when the difference between average altitude value Ha and average altitude value Hb is equal to or smaller than the predetermined threshold value, data processing section 70 estimates the determination region as ground surface F (STEP-334).

At clustering step STEP-3, when the set determination region is estimated as ground surface F in ground object region estimation process STEP-33, the process further proceeds to ground object region estimation process with image STEP-34 for the determination region.

When the determination region is estimated as ground surface F at ground object region estimation process STEP- 33, data processing section 70 performs an image process on the image data acquired with camera 61 and extracts edge Eg included in the image data (STEP-341).

Figure 17A:
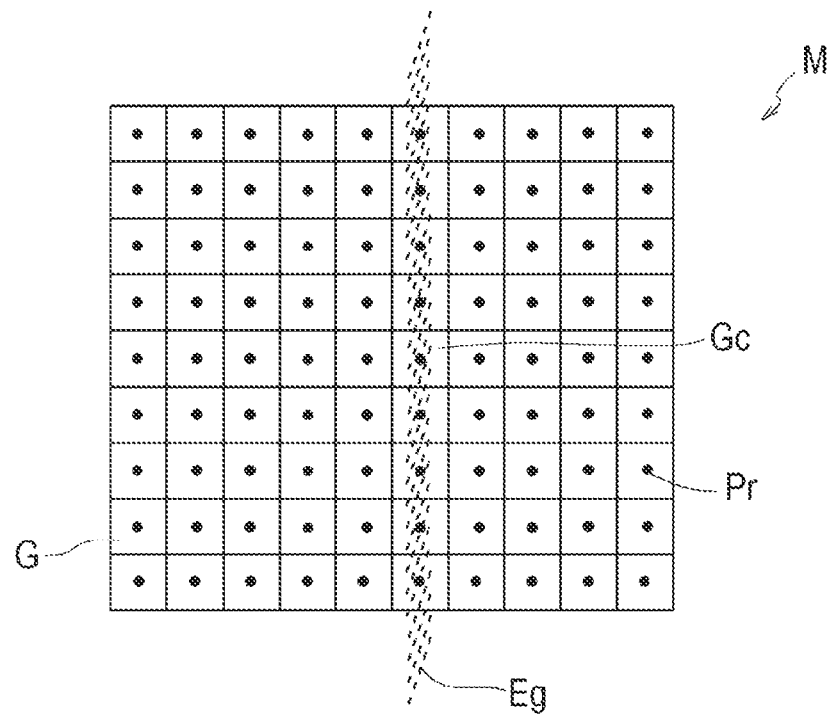
FIG. 17 is a diagram illustrating an overview of the ground object region estimation process with an image.

Next, data processing section 70 superimposes the image of extracted edge Eg on three-dimensional map M including the determination region estimated as ground surface F (see FIG. 17A)(STEP-342).

Figure 17B:
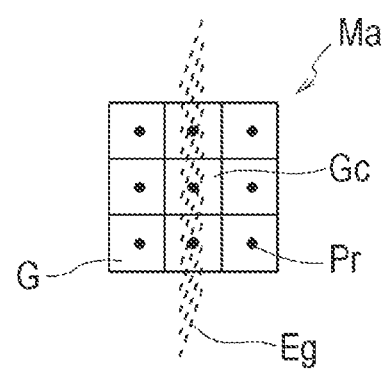

Next, data processing section 70 specifies grid cell Gc where edge Eg extracted in the determination region passes through, and sets nearby range Ma composed of a total of nine grid cells G with the specified grid cell Gc at the center (see FIG. 17B) (STEP-343).

Next, for each grid cell G included in nearby range Ma, data processing section 70 stores point group data P at a plurality of frames f·f . . . (for example, 30 frames) older than the newest frame f by a predetermined time (for example, one second) (STEP-344).

Next, data processing section 70 cuts the stored point group data P of a plurality of frames in a predetermined thickness in the height direction to divide it into sections of a plurality of layers with the predetermined thickness. Then, it specifies the uppermost layer (hereinafter referred to as uppermost layer) including point group data P from among the plurality of sectioned layers (STEP-345).

When a small ground object is irradiated with a laser beam, the ground object may fall within the laser measuring line interval, and point data p of the captured ground object may be insufficient (or there may be no point data p) with point group data P of one frame measured immediately before alone. By accumulating point group data P of several frames measured before the immediate one and using point group data P of the accumulated plurality of frames, point data p obtained when the laser hits the ground object is accumulated and revealed, and the presence of small ground object E and the approximate position of ground object E can be determined.

Specifically, in guide display device 50, data processing section 70 cuts the generated three-dimensional map M into a plurality of layers in the height direction for each grid cell G, and updates three-dimensional map M to set the average altitude value of point group data P included in the highest layer as the height the ground object E. With this guide display device 50, the height of small ground object E can be recognized.

In addition, in guide display device 50, nearby range Ma of edge Eg is a range composed of a total of nine grid cells Gc and C; namely, grid cell Gc where edge Eg passes through and eight grid cells G located around this grid cell Gc. With this guide display device 50, the position of small ground object E can be recognized.

Next, data processing section 70 calculates the average value of the heights of point group data P included in the specified uppermost layer, and updates the calculated average value as the altitude value of representative point Pr of the grid cell Gc (STEP-346). This update of the altitude value of representative point Pr is executed for all grid cells Gc extracted as the passage of edge Eg. Here, representative point Pr whose altitude value is updated is acquired as "representative point Pr2" at second process STEP-222 of the next three-dimensional map update process STEP-22, and the processing result of ground object region estimation process with image STEP-34 is reflected on three-dimensional map M at three-dimensional map update process STEP-22.

Next, data processing section 70 calculates average altitude value Hb again on the basis of the updated altitude value of representative point Pr (STEP-347).

Then, data processing section 70 performs redetermination based on the difference between average altitude value Ha and recalculated average altitude value Hb (STEP-348). When the difference between average altitude value Ha and average altitude value Hb is greater than a predetermined threshold value, the determination region is estimated as ground object E, and the determination region is output as ground object E (STEP-349). On the other hand, when the difference between average altitude value Ha and average altitude value Hb is equal to or smaller than the predetermined threshold value, data processing section 70 estimates the determination region as ground surface F (STEP-350).

Then, in guide display device 50, data processing section 70 recognizes edge Eg at ground object region estimation process with image STEP-34, accumulates the information about the estimated ground object E, and reflects it on three-dimensional map M. With guide display device 50, small ground object E can be reliably recognized by accumulating information once estimated as ground object E in the above-described manner.

In the image data captured with camera 61, small ground object E that cannot be captured by laser scanner 62 may be included in the identification region set as ground surface F. Guide display device 50 roughly determines the position where ground object E is present from the image process result by also using the image data captured with camera 61, and accumulates point group data P in the vicinity of the determined position to perform an averaging process on it, and thus, can suppress detection failure of small ground object E that cannot be captured by laser scanner 62. In this manner, guide display device 50 can acquire the height of ground object E regardless of the size (such as width and depth) of ground object E.

Specifically, guide display device 50 includes laser scanner 62 that scans lifting cargo W, ground surface F and ground object E from above the lifting cargo W, camera 61 that captures ground surface F, ground object E and lifting cargo W from above the lifting cargo W, and data processing section 70 that calculates representative point Pr by using point group data P acquired by laser scanner 62 for each grid cell G and creates three-dimensional map M on the basis of the representative point Pr, and three-dimensional map M is updated when representative point Pr calculated anew (Pr1) and existing representative point Pr (Pr2) are different from each other. Then, data processing section 70 in guide display device 50 detects edge Eg of ground object E on the basis of the processing result of the image data captured with the image of camera 61, and recognizes ground object E on the basis of edge Eg. Further, it accumulates point group data P in nearby range Ma of edge Eg of ground object E that is recognized to be ground surface F for predetermined frames prior to the time point of the capturing of the image data, and generates three-dimensional map M of ground object E whose edge Eg is recognized on the basis of the accumulated point group data P.

With guide display device 50 having the above-mentioned configuration, it is possible to reduce a situation where the location of small ground object E is erroneously recognized as ground surface F with no ground object E at the time of generation and update of three-dimensional map M. In this manner, ground object E can be recognized regardless of the size of ground object E.

Next, the image processing method in ground object region estimation process with image STEP-34 is described.

In guide display device 50, a Canny method is employed as the image processing method performed at the step of extracting edge Eg of ground extract object E (STEP-341).

The Canny method is a common image process algorithm for detecting the outline (edge Eg) of an image. The image process using the Canny method causes less failure in outline detection and less detection errors as its characteristics, and is suitable for extraction of edge Eg of ground object E at ground object region estimation process with image STEP-34. A method of extracting edge Eg through an image process employing the Canny method is described below.

First, data processing section 70 smoothes image data by using a smoothing filter and reduces the noise of the image data. More specifically, it uses a Gaussian filter as the smoothing filter. The Gaussian filter is a filter that performs a weight process on the luminance of the pixel in the vicinity of the pixel of interest in accordance with the distance from the pixel of interest by using a Gaussian function, and the Gaussian filter is commonly used as a smoothing filter.

Next, data processing section 70 extracts edge Eg on image data by using a space filter for extracting the outline of the smoothed image data. A Sobel filter is used as the space filter. The Sobel filter is a space filter with a combination of a smoothing filter and a differential filter, and performs a weight process on the luminance of the pixel in the vicinity of the pixel of interest while changing the weight amount in accordance with the distance from the pixel of interest.

Next, data processing section 70 performs thinning of the outline by leaving a portion where the strength of the extracted outline is maximum (i.e., a portion where the luminance is maximum in the normal direction of the outline), while deleting images of other portions.

Next, data processing section 70 applies two large and small predetermined threshold values to the image with an outline subjected to the thinning process so as to generate two binarized images. The smaller threshold value is set such that the outline that is not certain to be edge Eg is included in the binary conversion image to which the threshold value is applied. The larger threshold value is set such that only the outline that is certain to be edge Eg is included in the binary conversion image to which the threshold value is applied. Then, two binary conversion images generated in this manner are superimposed on one another, and the overlapping portion of the outline is finally extracted as edge Eg.

Note that the image processing method performed at the step of extracting edge Eg of ground extract object E (STEP-341) is not limited to the Canny method, and it is possible to employ a method of extracting edge Eg with only the Sobel filter, a method of extracting edge Eg with only the Laplacian filter, and other various methods capable of extracting edge Eg. In the Canny method, only the linear information is extracted as edge Eg, and therefore, in comparison with image processing methods of extracting edge Eg using only the Sobel filter or the Laplacian filter, the amount of information can be smaller, and the possibility of reduction in processing speed of data processing section 70 is lower. In view of this, in a situation where it suffices to roughly determine the position of edge Eg of ground object E as in STEP-341, it is preferable to employ the Canny method.

Specifically, in guide display device 50, data processing section 70 calculates edge Eg through an image process based on the Canny method. With this configuration, guide display device 50 can recognize the approximate position of small edge Eg of ground object E in real time.

In addition, guide display device 50 further includes data display section 80 that displays the image captured with camera 61. In guide display device 50, the guide information generated based on three-dimensional map M is displayed in a superimposed manner on the image captured with camera 61 on data display section 80. With this configuration, guide display device 50 can perform guide display for small ground object E.

Further, in crane 1 including guide display device 50 described above, guide display device 50 reliably displays the guide display without erroneously recognizing the location where small ground object E is located to be the ground surface with no ground object. Thus, the operator can reliably recognize small ground object E. and the workability is improved.

INDUSTRIAL APPLICABILITY

The present invention is applicable to a guide display device and a crane including the same.

REFERENCE SIGNS LIST

1 Crane
50 Guide display device
61 Camera
62 Laser scanner
70 Data processing section
80 Data display section
E Ground object
Eg Edge
F Ground surface
F Frame
G Grid
Gc Grid (where edge passes through)
M Three-dimensional map
Ma Nearby range
P Point group data
Pr Representative point
W Lifting cargo

The invention claimed is:

1. A guide display device of a crane, comprising:
a data processing section configured to calculate a representative point for each grid cell by using point group data acquired with a laser scanner by scanning a lifting cargo, a ground surface and a ground object from above the lifting cargo, create a three-dimensional map based on the representative point, and update the three-dimensional map when a representative point calculated anew and an existing representative point are different from each other,
wherein the data processing section detects an edge of the ground object based on a result of image processing of image data of the lifting cargo, the ground surface and the ground object captured with a camera from above the lifting cargo, recognizes the ground object based on the edge, accumulates, for predetermined frames prior to a time point of capturing the image data, the point group data that is in a nearby range of the edge of the ground object and is recognized to be the ground surface, and generates the three-dimensional map of the ground object whose edge is recognized based on the point group data that is accumulated.

2. The guide display device according to claim 1, wherein the data processing section cuts the three-dimensional map that is generated, into a plurality of layers in a height direction for each grid cell, and updates the three-dimensional map to set, as a height of the ground object, an average altitude value of the point group data included in a highest layer of the plurality of layers.

3. The guide display device according to claim 1, wherein the nearby range of the edge includes a total of nine grid cells composed of the grid cell where the edge passes through, and eight grid cells located around the grid cell where the edge passes through.

4. The guide display device according to claim 1, wherein the data processing section accumulates the three-dimensional map of the ground object whose edge is recognized.

5. The guide display device according to claim 1, wherein the data processing section calculates the edge through an image process based on a Canny method.

6. The guide display device according to claim 1, further comprising a data display section configured to display the image captured with the camera,
   wherein guide information generated based on the three-dimensional map is displayed on the data display section in a superimposed manner on the image captured with the camera.

7. A crane comprising the guide display device according to claim 1.

* * * * *